May 9, 1944. H. C. MILLAR Re. 22,477

AMMONIATED AGRICULTURAL MATERIAL AS LIVESTOCK FEED AND PROCESS OF PRODUCING SAME

Original Filed Aug. 28, 1940

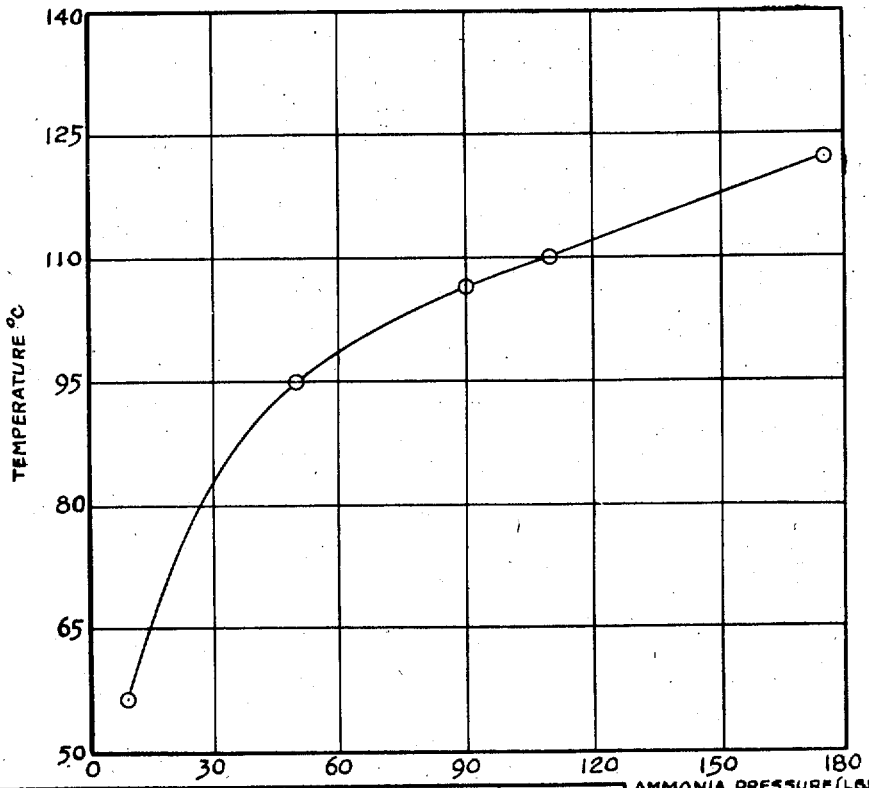

THE TEMPERATURE OBTAINED BY SUBJECTING AIR DRY SUGAR BEET PULP TO CERTAIN AMMONIA PRESSURES.

Fig. 1.

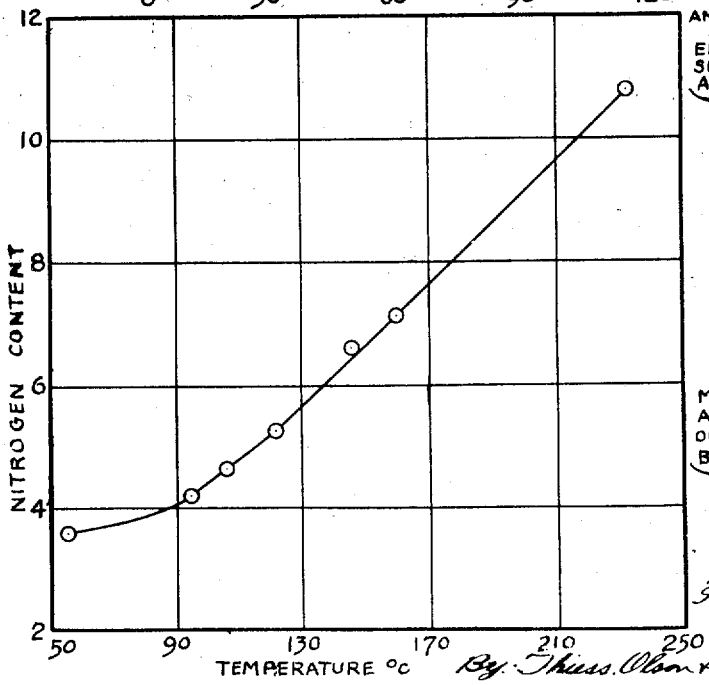

RELATION BETWEEN AMMONIATION TEMPERATURE AND THE NITROGEN CONTENT OF THE AMMONIATED SUGAR BEET PULP.

Fig. 2.

Inventor.

Harvey C. Millar.

By: Thiess, Olson & Mecklenburger, Attys.

Reissued May 9, 1944 Re. 22,477

UNITED STATES PATENT OFFICE 22,477

AMMONIATED AGRICULTURAL MATERIAL AS LIVESTOCK FEED AND PROCESS OF PRODUCING SAME

Harvey C. Millar, Western Springs, Ill., assignor to The Quaker Oats Company, Chicago, Ill., a corporation of New Jersey Original No. 2,293,845, dated August 25, 1942, Serial No. 354,573, August 28, 1940. Application for reissue July 19, 1943, Serial No. 495,299

15 Claims. (Cl. 99—2)

The present invention relates to a new and improved livestock feed derived from agricultural materials, and it relates more particularly to a protein food for ruminants and to a process of producing the same.

In the western part of the United States, where the amount of rainfall is small and where feeds are consequently very valuable, sugar-beet pulp and silages, such as corn silage and sunflower silage, constitute important livestock feeds. However, both sugar-beet pulp and silage are undesirably low in protein, and a simple, economical method of increasing their nitrogen so as to be available to ruminants as protein is highly desirable.

The object of the present invention is to obviate the foregoing disadvantages of sugar-beet pulp and silage as a food for ruminants.

A further object is to provide an improved livestock feed which is rich in nitrogen in a form that may be converted by ruminants into available protein.

Another object is the provision of a simple and economical method of converting sugar-beet pulp and silages into livestock food which can be utilized by ruminants as a source of protein.

It is further contemplated in accordance with the present invention to incorporate simple, non-proteinaceous nitrogen compounds in beet pulp and silage in such a form that ruminants may utilize the same as nitrogenous components of their diet.

I have found that the foregoing objects may be attained in accordance with the present invention, one aspect of which includes the preparation of an improved livestock food from sugar-beet pulp or silage, by ammoniating either or both of these agricultural materials, thereby imparting to the treated material a substantial amount of water-soluble, non-protein nitrogen in a form which is convertible by ruminants into available protein. The ammoniation may be carried out by treating the beet pulp or silage with anhydrous ammonia gas under superatmospheric pressure and temperature conditions, for example, at a pressure ranging from 5 to 1200 pounds gauge, at a temperature varying from room temperature to 250° C., and for a period varying from a few minutes to several hours. Preferably, the ammoniation is carried out at a pressure of from 10 to 200 pounds gauge, at a temperature of from 40° to 125° C., and for a period varying from 15 minutes to 3 hours.

The nitrogen imparted to the beet pulp or silage during the ammoniation step substantially increases the total nitrogen content of the raw material—for example, from 4 to 7 per cent. The nitrogen thus imparted is practically all in a water-soluble form, this being contrary to the results obtained when peat, starch, and dextrose are ammoniated. There is every indication to believe that the nitrogen contained in the ammoniated product is present in a form that constitutes a satisfactory source of protein nitrogen for ruminants. The nitrogen thus imparted is believed to be in a non-protein form, but apparently certain microorganisms in the ruminant's stomach are capable of converting these simple non-proteinaceous nitrogen compounds to a protein or proteins which are then rendered available to the animal.

In order more clearly to disclose the nature of the present invention, certain embodiments thereof will now be described. It should be understood, however, that this is done solely for illustrative purposes and is not to be construed as a limitation upon the scope of the appended claims.

The invention will be described with reference to the accompanying figures of the drawing, wherein Figure 1 is a graphical representation showing generally the relation between the resulting temperatures of air-dry sugar-beet pulp when the same is subjected to varying ammonia pressures; and Fig. 2 is a graphical representation showing generally the relation between the ammoniation temperatures and the nitrogen contents of ammoniated sugar-beet pulp.

The ammoniation of beet pulp or silage is preferably accomplished in accordance with the present invention by placing the raw material in a cylinder, autoclave, or bomb, depending upon the particular pressure and temperature conditions desired during the ammoniation step. The ammoniation cylinder may be steam-jacketed or otherwise heated, depending upon the particular temperature at which the reaction is to be carried out. The ammoniation vessel is preferably provided with suitable means so that the vessel may be rotated or the contents thereof agitated during the ammoniation period.

As a matter of convenience, the ammoniation of beet pulp will first be described, and thereafter the ammoniation of silage will be disclosed.

*The ammoniation of beet pulp.*—The ammoniation of beet pulp may be carried out by placing the original sugar-beet pulp, with or without the addition of moisture, into the above-described ammoniation vessel and then treating the contents with anhydrous gaseous ammonia under superatmospheric conditions. The moisture content of the original pulp has been found to exert no significant influence upon the amount of total or water-insoluble nitrogen fixed during the ammoniation step. This may be seen from an inspection of Table I, which gives the total water-insoluble nitrogen content of various ammoniated samples prepared from pulp of various moisture contents. The untreated original pulp had a moisture content of 8.1 per cent and a total nitrogen content of 1.6 per cent, of which 1.46 per cent was water-insoluble.

TABLE I

*Influence of the moisture content of dried sugar-beet pulp on the amount and character of the nitrogen fixed by ammoniation*

[Nitrogen values on moisture-free basis]

| Moisture content when ammoniated | Time | Ammonia pressure | Ammoniated product | | | |
|---|---|---|---|---|---|---|
| | | | Total nitrogen | Water-insoluble nitrogen | Water-soluble nitrogen derived from the added nitrogen | Moisture |
| *Per cent* | *Hours* | *Lbs. per sq. in.* | *Per cent* | *Per cent* | *Per cent* | *Per cent* |
| 8.1 | 1 | [1] 85–20 | 4.20 | 1.80 | 86.92 | 8.4 |
| 15.0 | 1 | 60 | 4.11 | 2.02 | 77.69 | 7.6 |
| 21.4 | 1 | 60 | 4.15 | 1.65 | 92.55 | 9.0 |
| 52.4 | 1 | 60 | 3.96 | 1.76 | 87.29 | 6.8 |

[1] Pressure was allowed to drop during the hour.

The data indicate that the moisture content of the pulp had no influence upon the nitrogen fixed during ammoniation. The last column of Table I, headed "Moisture, percent," indicates the moisture content of the ammoniated product after it was air-dried.

The ammoniation of sugar-beet pulp for one hour at different ammonia pressures, without the addition of external heat, is shown in Table II. The ammonia pressures, except for sample 8, were maintained during the entire periods at the values shown in the table. In sample 8, however, the pressure was allowed to decrease as the ammoniation chamber revolved and the ammonia was fixed.

The results indicate that a considerable amount of heat is liberated during the ammoniation of sugar-beet pulp, with the temperature increasing as the pressure is raised.

TABLE II

*The temperature obtained by subjecting sugar-beet pulp to certain ammonia pressures and the nitrogen content of the ammoniated pulp*

[Nitrogen values on moisture-free basis]

| Sample No. | Dried beet pulp | | | | Ammoniated product | | | |
|---|---|---|---|---|---|---|---|---|
| | Moisture content when ammoniated | Pressure | Maximum temperature obtained | Time | Total nitrogen | Water-insoluble nitrogen | Water-soluble nitrogen derived from the added nitrogen | Moisture |
| | *Per cent* | *Lbs. per sq. inch* | *°C.* | *Hours* | *Per cent* | *Per cent* | *Per cent* | *Per cent* |
| 1 | 8.1 | 10 | 57 | 1.0 | 3.53 | 1.73 | 86.01 | 8.9 |
| 2 | 15.0 | 15 | ---------- | 1.0 | 3.53 | 2.06 | 68.91 | 8.9 |
| 3 | 15.0 | 40 | ---------- | 1.0 | 3.80 | 1.86 | 81.31 | 8.8 |
| 4 | 8.1 | 50 | 95 | 1.0 | 4.16 | 1.73 | 89.45 | 8.7 |
| 5 | 15.0 | 60 | ---------- | 1.0 | 4.11 | 2.02 | 77.69 | 7.6 |
| 6 | 8.1 | 90 | 106 | 1.0 | 4.62 | 1.94 | 84.10 | 8.5 |
| 7 | 8.1 | 175 | 122 | 1.0 | 5.25 | 1.59 | 96.44 | 7.5 |
| 8 | 15.0 | 100 start<br>60 after 4 min.<br>40 after 7 min.<br>20 after 10 min. | ---------- | 0.166 | 3.89 | 1.70 | 85.14 | 8.6 |

The relations of Table II between pressure and maximum temperature obtained by the reaction mass are shown in Fig. 1. The net amount of nitrogen fixed increased as the pressure and temperature increased. But, as shown in Table II, there is little change in the amount of water-insoluble nitrogen imparted to the pulp. Thus, for example, sample 8, ammoniated for only 10 minutes, contained 3.89 per cent nitrogen.

Materials treated as shown in Table II will, when removed from the reaction chamber, retain a certain amount of free ammonia which may be removed if desired by any suitable means, such as by subjecting the material to a high vacuum, thus recovering the ammonia. Preferably a suitable reactant, such as monocalcium phosphate, may be added to the material, which will fix the ammonia. Such a procedure will result in a feed of improved mineral content as well as improved nitrogenous value.

The influence of temperature and pressure on the nitrogen content of ammoniated sugar-beet pulp is indicated by the results shown in Table III and Fig. 2. During this study, samples were ammoniated in a cylinder, autoclave, or bomb, according to the temperature and pressure desired. The heat of the reaction mass was augmented by putting steam through the jacket of the autoclave or by placing the bomb in a sand bath.

The data of Table III show that the amount of total nitrogen imparted to the pulp was very closely related to the ammoniation temperature, and furthermore that the water-soluble nitrogen derived from the added nitrogen was above 84 per cent, except when very high temperatures were employed, as in sample 7. The data indicate that at corresponding temperatures equally good results are obtained by ammoniating for a period of 25 minutes as for a longer period.

Ammoniation at a pressure above 1,000 pounds per square inch for 2 hours at 232° C. gave a product containing 10.72 per cent nitrogen (see sample 7), most of which was water-insoluble. Under similar conditions, except that the temperature was lower, a product having a total nitrogen content of 7.61 per cent was obtained (see sample 8).

TABLE III

*Influence of ammoniation temperature and pressure on the nitrogen content of ammoniated sugar-beet pulp*

[Nitrogen values on moisture-free basis]

| Sample No. | Dried beet pulp | | | | Ammoniated product | | | | |
|---|---|---|---|---|---|---|---|---|---|
| | Moisture content when ammoniated | Pressure | Temperature | Time | Total nitrogen | Water-insoluble nitrogen | Water-soluble nitrogen derived from the added nitrogen | Moisture | Color |
| | *Per cent* | *Lbs. per sq. in.* | *°C.* | *Hours* | *Per cent* | *Per cent* | *Per cent* | *Per cent* | |
| Original pulp | | | | | 1.60 | 1.46 | | 8.1 | Grey. |
| 1 | 8.1 | 10 | 57 | 1 | 3.53 | 1.73 | 86.01 | 8.9 | Olive green. |
| 2 | 8.1 | 50 | 95 | 1 | 4.16 | 1.73 | 89.45 | 8.7 | Brown. |
| 3 | 8.1 | 90 | 106 | 1 | 4.62 | 1.94 | 84.10 | 8.5 | Do. |
| 4 | 8.1 | 175 | 122 | 1 | 5.25 | 1.59 | 96.44 | 7.5 | Do. |
| 5 | 15.0 | 120 | 145 | 3 | 6.60 | 2.26 | 84.00 | 11.4 | Dark brown. |
| 6 | 15.0 | 160 | 160 | 3 | 7.09 | 2.10 | 88.16 | 9.5 | Do. |
| 7 | 8.1 | 1,050 | 232 | 2 | 10.72 | 6.34 | 46.49 | 7.0 | Black. |
| 8 | 8.1 | 1,175 | 122 | 2 | 7.61 | 1.01 | 100.00 | 7.0 | Dark brown. |
| 9 | 15.0 | 120 start<br>45 finish | 105 | 1 | 4.60 | 1.69 | 92.33 | 8.4 | Light brown. |
| 10 | 8.1 | 110 | 110 | 0.41 | 4.58 | 1.71 | 91.61 | 8.5 | Brown. |

That the nitrogen added to sugar-beet pulp by ammoniation is not merely the result of neutralizing free acids is shown by the fact that 0.35 ml. of 1.00 normal NaOH was required in titrating a 10-gram dry sample, using phenolphthalein, to a pink color permanent for 5 minutes. This is equivalent to only .059 per cent $NH_3$ imparted to the beet pulp.

(*a*) *Palatability of ammoniated sugar-beet pulp for dairy cows and sheep.*—The comparative palatability of three sugar-beet pulp samples was tested by feeding them to dairy cows and sheep. Sample 1 was the original untreated pulp. Sample 2 was a composite of ammoniated sample and was predominantly green, with a nitrogen content of about 4.4 per cent. Sample 3 was also a composite of ammoniated samples and was dark brown, with a nitrogen content of about 6.3 per cent. The results of the palatability tests showed that, when fed alone to dairy cattle, samples 1 and 2 appeared to be equally palatable. Sheep ate samples 1 and 2 readily, either when fed alone or in grain mixtures. Sheep and cattle refused sample 3, however, when fed alone, but ate it fairly well when mixed with grains. Liberal quantities of ammoniated sugar-beet pulp containing 4.4 per cent nitrogen were readily eaten by year-old dairy stock.

*Ammoniation of corn silage.*—Corn silage was obtained in the spring of the year from the lower portion of a cement silo. The first and second portions of the silage secured for this work contained 50 per cent and 67 per cent moisture, respectively. Part of the sample containing 50 per cent moisture was allowed to air-dry to 17.5 per cent moisture, while another portion was allowed to dry to 9 per cent.

The various samples of silage were then ammoniated under conditions shown in Table IV. The first eight samples were ammoniated in a cylinder with no heat applied, whereas the last two were ammoniated in a bomb heated in a sand bath. The quantity of silage used completely filled the ammoniation vessel in each case.

TABLE IV

*The ammoniation of cured corn silage*

[Nitrogen values on moisture-free basis]

| Sample No. | Moisture content when ammoniated | Ammonia added | Pressure | Maximum temperature obtained | Time | Ammoniated product | | |
|---|---|---|---|---|---|---|---|---|
| | | | | | | Total nitrogen | Water-insoluble nitrogen | Moisture |
| | *Per cent* | *Ounces* | *Lbs. per sq. in.* | *°C.* | *Hours* | *Per cent* | *Per cent* | *Per cent* |
| Original (dry) | | | | | | 1.26 | 0.61 | 9.1 |
| 1 | 17.5 | | 10 | 64 | 1 | 2.78 | 0.71 | 9.0 |
| 2 | 17.5 | | 155 | 77 | 1 | 3.05 | 0.74 | 8.3 |
| 3 | 50.0 | | 10 | 69 | 1 | 2.94 | 0.74 | 9.8 |
| 4 | 50.0 | | 155 | 108 | 1 | 3.35 | 0.73 | 9.0 |
| 5 | 67.0 | 1 | | | 1 | 2.34 | 0.54 | 7.5 |
| 6 | 67.0 | 2 | | | 1 | 2.53 | 0.49 | 8.5 |
| 7 | 67.0 | 5 | | | 1 | 2.53 | 0.49 | 8.7 |
| 8 | 67.0 | 12 | | 48 | 1 | 2.71 | 0.49 | 8.4 |
| 9 | 9.0 | | 700 | 190 | 1 | 3.60 | 1.14 | 2.5 |
| 10 | 9.0 | | 1,050 | 218 | 2.5 | 7.81 | 4.69 | 3.0 |

The results indicate that the original silage contained only 1.26 per cent total and 0.61 per cent water-insoluble nitrogen. The nitrogen content of the samples ammoniated at all four moisture values increased with the amount of ammonia used. Moreover, the samples which were permitted to dry before ammoniation attained a lower temperature and fixed less ammonia than those which were not permitted to dry.

The samples containing 67 per cent moisture received a measured amount of ammonia. One ounce added to a 10-pound sample gave a product having 2.34 per cent nitrogen. This exhibited only faint odors of ammonia when taken from the chamber. When the amount of ammonia was increased to 12 ounces, the nitrogen content of the product increased only very slightly, but the product emitted a strong ammonia odor. The nitrogen added to the samples ammoniated at low temperature and pressure was practically all in a water-soluble form, whereas high-temperature and high-pressure ammoniation gave a black product having 7.8 per cent total and 4.69 per cent water-insoluble nitrogen.

(a) *Palatability of ammoniated corn silage.*—The ammoniated samples of corn silage, except samples 9 and 10, prepared from air-dried samples were readily eaten by year-old dairy stock. The nitrogen content of the product compares favorably to that of the best hays.

From the foregoing detailed description it will be apparent that many variations may be made without departing from the spirit and scope of the invention. Thus, for example, time, temperature, and pressure relationships obtaining during the ammoniation treatment may be varied within very wide limits. Other forms of equipment than those hereinbefore mentioned may be substituted where desired. Many other variations will be apparent to those skilled in the art. I therefore intend to be limited only in accordance with the following patent claims.

I claim:

1. A method of preparing an improved livestock food from an agricultural roughage which includes the step of ammoniating said roughage to impart thereto a substantial amount of nitrogenous material utilizable for nutritional purposes.

2. A method of preparing an improved livestock feed from an agricultural roughage which includes the step of treating said roughage with anhydrous ammonia gas under superatmospheric pressure and temperature conditions to impart thereto a substantial amount of nitrogeneous material utilizable for nutritional purposes.

3. A method of preparing an improved livestock food from an agricultural roughage selected from the group consisting of sugar-beet pulp, corn silage, and sunflower silage, which includes the step of ammoniating said roughage to impart thereto a substantial amount of nitrogeneous material utilizable for nutritional purposes.

4. A method of preparing an improved livestock feed from an agricultural roughage selected from the group consisting of sugar-beet pulp, corn silage and sunflower silage, which includes the step of treating said roughage with anhydrous ammonia gas under superatmospheric pressure and temperature conditions to impart thereto a substantial amount of nitrogeneous material utilizable for nutritional purposes.

5. The method of claim 2 wherein said treatment with ammonia gas is carried out at a pressure within the range of 5 to 1200 pounds gauge, at a temperature within the range of room temperature to 250° C., and for a period of time within the range of 15 minutes to 3 hours.

6. The method of claim 4 wherein said treatment with ammonia gas is carried out at a pressure within the range of 5 to 1200 pounds gauge, at a temperature within the range of room temperature to 250° C., and for a period of time within the range of 15 minutes to 3 hours.

7. The method of claim 2 wherein said treatment with ammonia gas is carried out at a pressure within the range of 10 to 200 pounds gauge, at a temperature within the range of 40° to 125° C., and for a period of from 15 minutes to 3 hours.

8. The method of claim 4 wherein said treatment with ammonia gas is carried out at a pressure within the range of 10 to 200 pounds gauge, at a temperature within the range of 40° to 125° C., and for a period of from 15 minutes to 3 hours.

9. An improved livestock feed for ruminants comprising a member of the group consisting of ammoniated sugar-beet pulp and ammoniated corn silage.

10. An improved livestock feed for ruminants comprising ammoniated sugar-beet pulp.

11. An improved livestock feed derived by ammoniation of an agricultural roughage selected from the group consisting of sugar-beet pulp, corn silage, and sunflower silage, and characterized by a nitrogen content substantially greater than that of the unammoniated material, said nitrogen being in a form utilizable for nutritional purposes.

12. A method of improving the color of a livestock feed prepared from sugar-beet pulp that comprises treating said pulp with ammonia.

13. A method of improving the color of a livestock feed prepared from sugar-beet pulp that comprises treating sugar-beet pulp in accordance with the method of claim 2.

14. An improved livestock feed comprising ammoniated agricultural roughage.

15. An improved livestock feed comprising ammoniated agricultural materials containing nonproteinaceous nitrogen compounds usable by ruminants as a source of protein.

HARVEY C. MILLAR.